(12) United States Patent
Zhu et al.

(10) Patent No.: US 11,609,466 B2
(45) Date of Patent: Mar. 21, 2023

(54) DISPLAY PANEL AND DISPLAY DEVICE

(71) Applicants: Wuhan BOE Optoelectronics Technology Co., Ltd., Hubei (CN); BOE Technology Group Co., Ltd., Beijing (CN)

(72) Inventors: Ning Zhu, Beijing (CN); Peng Jiang, Beijing (CN); Yanping Liao, Beijing (CN); Yujie Gao, Beijing (CN); Jun Liu, Beijing (CN)

(73) Assignees: Wuhan BOE Optoelectronics Technology Co., Ltd., Hubei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/483,595

(22) Filed: Sep. 23, 2021

(65) Prior Publication Data

US 2022/0229338 A1   Jul. 21, 2022

(30) Foreign Application Priority Data

Jan. 19, 2021   (CN) .......................... 202110067299.2

(51) Int. Cl.
   *G02F 1/1368*   (2006.01)
   *G02F 1/1362*   (2006.01)

(52) U.S. Cl.
   CPC .. *G02F 1/136286* (2013.01); *G02F 1/136209* (2013.01)

(58) Field of Classification Search
   CPC .................................................. G02F 1/1362
   See application file for complete search history.

(56) References Cited

U.S. PATENT DOCUMENTS

| | | | |
|---|---|---|---|
| 2001/0013915 A1* | 8/2001 | Song ................. | G02F 1/134363 349/123 |
| 2011/0181816 A1* | 7/2011 | Kang ................. | G02F 1/133345 257/E21.211 |
| 2018/0040278 A1 | 2/2018 | Chu et al. | |
| 2019/0122626 A1* | 4/2019 | Du ........................ | G02F 1/1362 |
| 2020/0202788 A1* | 6/2020 | Chu ..................... | G09G 3/3266 |
| 2021/0151525 A1* | 5/2021 | Li ...................... | G02F 1/133512 |
| 2021/0175260 A1 | 6/2021 | Chen et al. | |

(Continued)

FOREIGN PATENT DOCUMENTS

| | | |
|---|---|---|
| CN | 101847641 A | 9/2010 |
| CN | 104516167 A | 4/2015 |

(Continued)

OTHER PUBLICATIONS

CN202110067299.2 first office action.

*Primary Examiner* — Sang V Nguyen
(74) *Attorney, Agent, or Firm* — IPro, PLLC (57) ABSTRACT

Disclosed in the disclosure are a display panel and a display device. The display panel includes: a first base substrate; a plurality of scan signal lines arranged on a side of the first base substrate; a plurality of data signal lines arranged on sides, facing away from the first base substrate, of the scan signal lines; and first shielding parts arranged on sides, facing away from the scan signal lines, of the data signal lines, wherein each first shielding part is of a strip structure, and in each sub-pixel unit, both sides of the data signal line are each provided with one first shielding part.

13 Claims, 4 Drawing Sheets

(56) References Cited

U.S. PATENT DOCUMENTS

2021/0223647 A1* 7/2021 Wang ................ G02F 1/136286
2021/0364871 A1  11/2021 Xiao

FOREIGN PATENT DOCUMENTS

| CN | 104614910 A |   | 5/2015 |
|----|-------------|---|--------|
| CN | 104882450 A |   | 9/2015 |
| CN | 106125389   | * | 11/2016 |
| CN | 106873278 A |   | 6/2017 |
| CN | 107688263 A |   | 2/2018 |
| CN | 108681170 A |   | 10/2018 |
| CN | 110824795 A |   | 2/2020 |
| CN | WO 2022047793 | * | 3/2022 |

* cited by examiner

DISPLAY PANEL AND DISPLAY DEVICE

CROSS REFERENCE TO RELATED APPLICATIONS

The present disclosure claims priority to Chinese Patent Application No. 202110067299.2 filed to the China National Intellectual Property Administration on Jan. 19, 2021, the entire contents of which are incorporated herein by reference.

FIELD

The present disclosure relates to the field of display, in particular to a display panel and a display device.

BACKGROUND

As a predomination display screen at present, a liquid crystal display panel has the advantages of low power consumption, small size, and low radiation.

At present, commonly used horizontal electric field mode liquid crystal display panels include an in-plane switching (IPS) mode liquid crystal display panel and an advanced super dimension switch (ADS) mode liquid crystal display panel.

An ADS display mode is widely used in the display field because of its characteristics such as wide viewing angle, high resolution, and low power consumption. In order to achieve the effect of high transmittance, a pixel electrode is covered in the range of data signal lines in current large-size and super-size display devices. However, at the same time, the parasitic capacitance of the data signal lines will increase by the order of magnitudes of 2-3 times, which directly causing a drive to fail to work normally.

SUMMARY

The present disclosure provides a display panel and a display device.

In a first aspect, the present disclosure provides a display panel, including:

a first base substrate;

a plurality of scan signal lines arranged on a side of the first base substrate, the plurality of scan signal lines extend in a first direction, and are arranged in a second direction, and the first direction and the second direction cross;

a plurality of data signal lines arranged on sides, facing away from the first base substrate, of the scan signal lines, the plurality of data signal lines extend in the second direction, and are arranged in the first direction, and the plurality of scan signal lines and the plurality of data signal lines define a plurality of sub-pixel units; and first shielding parts arranged on sides, facing away from the scan signal lines, of the data signal lines, the first shielding parts each is of a strip structure ands extend in the second direction, and in each of the sub-pixel units, both sides, in the first direction, of the data signal line are each provided with a respective one of the first shielding parts.

In some embodiments of the present disclosure, the display panel includes:

a gate metal layer arranged on the first base substrate, wherein the gate metal layer includes patterns of the plurality of scan signal lines and patterns of a plurality of common electrode signal lines;

a gate insulating layer arranged on a side, facing away from the first base substrate, of the gate metal layer;

a source-drain metal layer arranged on a side, facing away from the gate metal layer, of the gate insulating layer, wherein the source-drain metal layer includes patterns of the plurality of data signal lines;

a passivation layer arranged on a side, facing away from the gate insulating layer, of the source-drain metal layer; and an organic film layer arranged on a side, facing away from the source-drain metal layer, of the passivation layer;

the first shielding parts are located on a surface of a side, facing away from the passivation layer, of the organic film layer.

In some embodiments of the present disclosure, the display panel further includes: a plurality of pixel electrodes and a plurality of common electrodes;

the pixel electrodes and the gate metal layer are disposed in a same layer, and a pattern of the pixel electrodes and a pattern of the gate metal layer do not overlap each other; or, the pixel electrodes and the source-drain metal layer are disposed in a same layer; and the common electrodes are arranged on the surface of the side, facing away from the passivation layer, of the organic film layer.

In some embodiments of the present disclosure, the common electrodes each is a comb electrode, and an extending direction of the comb electrode is the second direction;

the first shielding parts and the common electrode are connected with each other; and signals applied by the first shielding parts are same as signals applied by the common electrodes.

In some embodiments of the present disclosure, the display panel further includes:

second shielding parts arranged on sides, facing away from the first shielding parts, of the data signal lines, wherein the second shielding parts each is of a strip structure and extends in the second direction, and in each of the sub-pixel units, both sides, in the first direction, of the data signal line are each provided with a respective one of the second shielding parts.

In some embodiments of the present disclosure, the second shielding parts and the gate metal layer are disposed in a same layer; the second shielding parts and the common electrode signal lines are connected with each other; and signals applied by the first shielding parts are same as signals applied by the common electrodes and signals applied by the second shielding parts are same as signals applied by the common electrodes.

In some embodiments of the present disclosure, a first region of the organic film layer covering the data signal lines, a region, other than the first region, of the organic film layer is a second region, and a thickness of the first region is greater than a thickness of the second region; and the organic film layer is arranged as an inclined surface at a boundary between the first region and the second region, and the first shielding parts are disposed on the inclined surface.

In some embodiments of the present disclosure, the thickness of the first region is set to range from 2 μm-3 μm, and the thickness of the second region is 8000 Å.

In some embodiments of the present disclosure, an orthographic projection, on the first base substrate, of the first shielding parts does not overlap with an orthographic projection, on the first base substrate, of the data signal lines.

In some embodiments of the present disclosure, an orthographic projection, on the first base substrate, of the second shielding parts does not overlap with an orthographic projection, on the first base substrate, of the data signal lines each other.

In some embodiments of the present disclosure, a thickness of the passivation layer is 1000 Å.

In some embodiments of the present disclosure, the pixel electrode is a block electrode.

In some embodiments of the present disclosure, the display panel further includes:

a second base substrate disposed opposite to the first base substrate;

a color film layer arranged on a side, facing the first base substrate, of the second base substrate; and a liquid crystal layer arranged between the first base substrate and the second base substrate.

In some embodiments of the present disclosure, the liquid crystal layer adopts positive liquid crystals or negative liquid crystals.

In a second aspect, the present disclosure further provides a display device, including any of the display panels.

BRIEF DESCRIPTION OF THE DRAWINGS

In order to more clearly illustrate the technical solutions of the embodiments of the present disclosure, the drawings used in the embodiments of the present disclosure will be briefly described below, and it is apparent that the drawings described below are only some embodiments of the present disclosure, and that other drawings may be obtained from the drawings without involving any inventive effort for those skilled in the art.

DETAILED DESCRIPTION OF THE EMBODIMENTS

To further clarify the objects, features and advantages of the present disclosure, a more particular description of the present disclosure will be rendered by reference to the appended drawings and embodiments. However, the exemplary embodiments may be implemented in a variety of forms and should not be construed as limited to the implementations set forth herein; rather, these implementations are provided so that this disclosure will be more thorough and complete, and will fully convey the concept of the exemplary implementations to those skilled in the art. In the drawings, the same reference numerals denote the same or similar structures, and thus a repeated description thereof will be omitted. The words expressing positions and orientations described in this disclosure are illustrated by way of example in the accompanying drawings and may be varied as required and are intended to be within the protection scope of this disclosure. The drawings of the present disclosure are only intended to illustrate relative positional relations and are not to scale.

A liquid crystal display is mainly composed of a backlight module and a liquid crystal display panel. The liquid crystal display panel does not emit light by itself and needs to rely on a light source provided by the backlight module to achieve brightness display.

The imaging principle of the liquid crystal display is that liquid crystals are placed between two pieces of conductive glass, and driven by an electric field between two electrodes to cause an electric field effect of liquid crystal molecule distortion, so as to control the transmission or shielding function of a backlight source, and thus an image is displayed. If a color filter is added, a color image may be displayed.

At present, commonly used horizontal electric field mode liquid crystal display panels include an in-plane switching (IPS) mode liquid crystal display panel and an advanced super dimension switch (ADS) mode liquid crystal display panel.

The ADS display panel includes an array substrate, an opposite substrate, and a liquid crystal layer located between the array substrate and the opposite substrate. When no voltage is applied to the display panel, liquid crystal molecules are distributed in a cell in parallel, light cannot pass through, and a "black state" is displayed. When a voltage is applied to the display panel, the liquid crystals rotate transversely under driving of an electric field of the array substrate, then light may pass through, and a "white state" is displayed.

The current ADS mode liquid crystal display panel often uses horizontal slit electrodes, which inevitably produces dark fields in an overlapping region of the centers of pixels. Moreover, the effect is not ideal when the horizontal slit electrodes are used with negative liquid crystals.

When a half-white half-black picture is displayed, a data signal line is at a high level, and a black picture region will leak light due to the interference of a high-level signal. Therefore, a black matrix in the current ADS panel needs to be widened to avoid the problem of light leakage, but such a design will lose a pixel opening region, resulting in a decrease in light transmittance.

Figure 1:
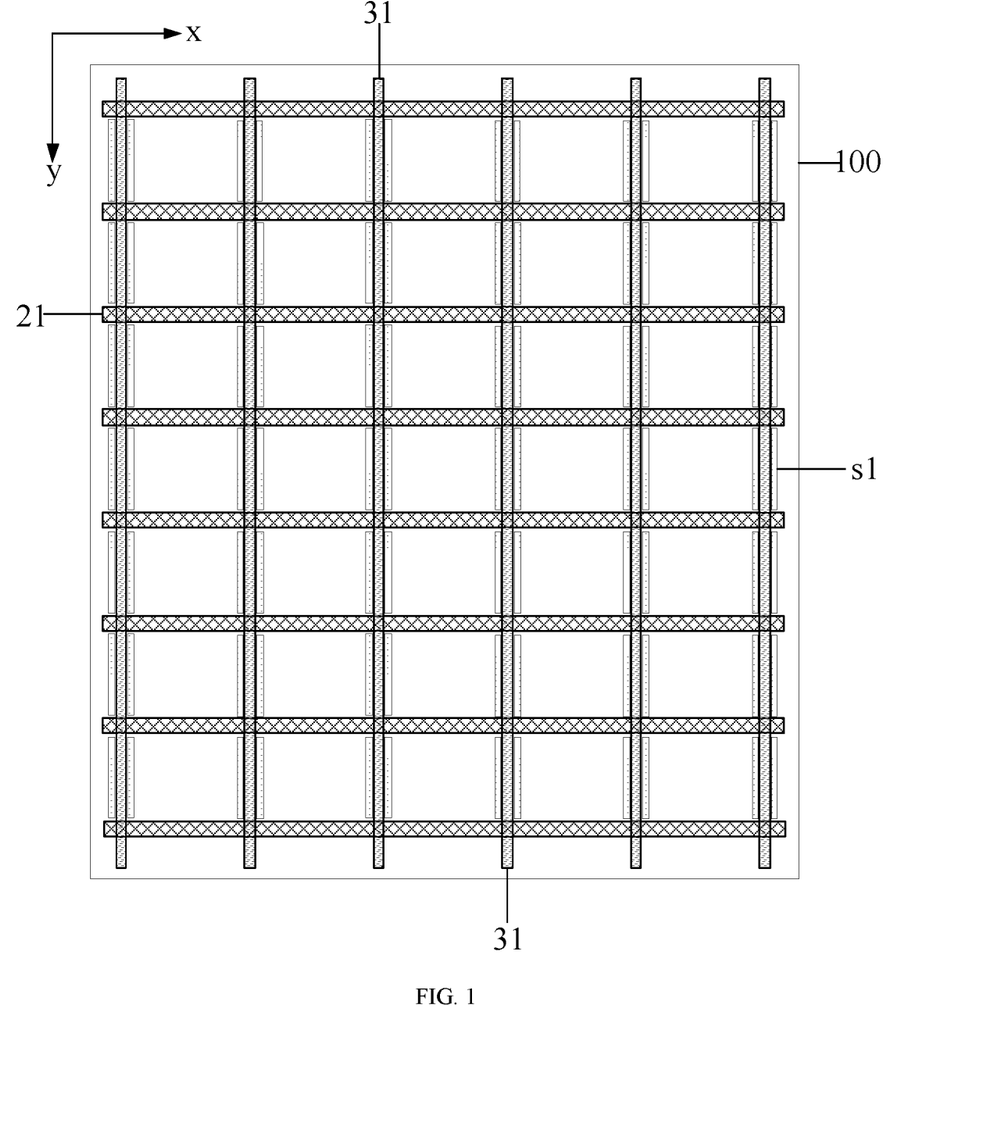
FIG. 1 is a first schematic diagram of a planar structure of a display panel provided by an embodiment of the present disclosure.

In view of this, the embodiments of the present disclosure provide a display panel. FIG. 1 is a first schematic diagram of a planar structure of the display panel provided by the embodiment of the present disclosure.

Referring to FIG. 1, the display panel includes: a first base substrate 100, a plurality of scan signal lines 21, and a plurality of data signal lines 31.

The scan signal lines 21 are located on a side of the first base substrate 100, and the scan signal lines 21 extend in a first direction x, and are arranged in a second direction y. The first direction x and the second direction y intersect.

In specific implementation, the first direction x may be a row direction of a sub-pixel unit, the second direction y may be a column direction of the sub-pixel unit, and the first direction x and the second direction y are perpendicular to each other.

The plurality of data signal lines 31 are located on sides, facing away from the first base substrate 100, of the scan signal lines 21. The data signal lines 31 extend in the second direction y, and are arranged in the first direction x.

The plurality of scan signal lines 21 and the plurality of data signal lines 31 define a plurality of sub-pixel units.

Each of the sub-pixel units is provided with a pixel electrode and a common electrode inside, and an electric field generated between the pixel electrode and the common electrode is an effective electric field configured to control the liquid crystals. However, when transmitting a signal, the data signal lines 31 will interfere with the effective electric field at an edge region of each sub-pixel unit, so a black matrix covering the data signal lines will be widened, resulting in a decrease in the opening region.

In the embodiments of the present disclosure, first shielding parts s1 are disposed on sides, facing away from the scan signal lines, of the data signal lines 31. As shown in FIG. 1, each of the first shielding parts s1 extends in the second direction y, which is the same as the extending direction of the data signal lines 31. In each of the sub-pixel units, both sides, in the first direction x, of the data signal line 31 are each provided with one first shielding part.

In specific implementation, the first shielding parts s1 may load stable signals, so that when the data signal lines 31 generate electric field lines to a sub-pixel unit region, the electric field lines will be shielded by the first shielding parts s1, thereby mitigating the influence of signals on the data signal lines 31 on the effective electric field in the edge regions of the sub-pixel units, decreasing the width of the black matrix covering the data signal lines 31, increasing the opening areas of the sub-pixel units, and improving transmittance.

Figure 2:
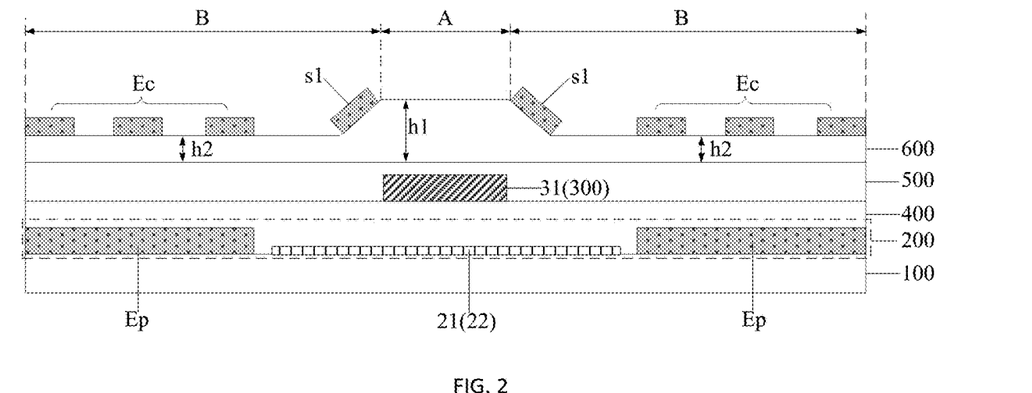
FIG. 2 is a first schematic diagram of a cross-sectional structure of a display panel provided by an embodiment of the present disclosure.

FIG. 2 is a first schematic diagram of a cross-sectional structure of the display panel provided by the embodiment of the present disclosure.

Referring to FIG. 2, the display panel provided by the embodiments of the present disclosure includes: the first base substrate 100, a gate metal layer 200, a gate insulating layer 400, a source-drain metal layer 300, a passivation layer 500, an organic film layer 600, the common electrodes Ec and the pixel electrodes Ep.

The gate metal layer 200 is arranged on the first base substrate 100. The gate metal layer includes a pattern of a gate, patterns of the plurality of scan signal lines, and patterns of a plurality of common electrode signal lines. The gate metal layer 200 may adopt a single-layer or multi-layer metal stacked structure, which is not limited here.

The gate insulating layer 400 is located on a side, facing away from the first base substrate 100, of the gate metal layer 200. The gate insulating layer 400 is configured to insulate and protect an image of the gate metal layer 200, so as to form patterns of other metal layers on the gate insulating layer 400. The gate insulating layer 400 may be made of silicon oxide, silicon nitride, etc., which is not limited here.

After the gate insulating layer 400 is formed, a pattern of an active layer may be formed on the gate insulating layer 400. The active layer is a functional film layer configured to make thin film transistors. The active layer includes a source region and a drain region formed by doping N-type ions or P-type ions. A region between the source region and the drain region is a non-doped channel region. Then, an interlayer insulating layer is formed on the active layer, and patterns of other metal layers are formed on the interlayer insulating layer.

The source-drain metal layer 300 is located on a side, facing away from the gate metal layer 200, of the gate insulating layer 400, and may be specifically formed on the interlayer insulating layer. The source-drain metal layer 300 includes patterns of the plurality of data signal lines 31. In addition, the source-drain metal layer 300 also includes a pattern of a source and a pattern of a drain (not shown in the figure). The source-drain metal layer 300 may adopt a single-layer or multi-layer metal stacked structure, which is not limited here.

The gate, the active layer, the source and the drain constitute a thin film transistor (TFT) device structure.

The passivation layer 500 is arranged on a side, facing away from the gate insulating layer 400, of the source-drain metal layer 300. The passivation layer 500 serves as a protective layer for the active layer to prevent the active layer from being contaminated or corroded by other substances. The passivation layer 500 may be made of silicon oxide, and the thickness is about 1000 angstroms.

The organic film layer 600 is located on a side, facing away from the source-drain metal layer 300, of the passivation layer 500. After being formed, the thin passivation layer 500 is coated with the organic film layer of about 2 µm-3 µm.

In the embodiments of the present disclosure, a material of the organic film layer 600 has properties similar to negative photoresist. In the embodiments of the present disclosure, the organic film layer 600 is exposed by using a halftone mask. As shown in FIG. 2, the organic film layer 600 is divided into two regions, wherein a region covering the data signal lines 31 is a first region A, and regions other than the first region A are second regions B.

For the first region A, the mask is completely light-transmitting, so that the organic film layer in the first region A has sufficient exposure, and the thickness of the organic film layer in the first region A is large and the thickness is about 2 µm-3 µm. For the second regions B, part of the mask is light-transmitting, so that the exposure of the organic film layer in the second regions B is limited to a certain extent, and the thickness of the organic film layer in the second regions B is small and the thickness is about 8000 angstroms.

When the organic film layer is exposed, effective via holes are formed to prepare conditions for etching the passivation layer 500. The via holes are used for the connection between the common electrodes and the common electrode lines and the connection the pixel electrodes and the TFT device.

The common electrodes Ec are disposed on the surface of a side, facing away from the passivation layer 500, of the organic film layer 600. The first shielding parts s1 are disposed on the same layer as the common electrodes Ec.

The pixel electrodes Ep are located below the common electrodes Ec, i.e. the pixel electrodes Ep are located a side, facing the first base substrate, of the common electrodes Ec. As shown in FIG. 2, the pixel electrodes Ep and the gate metal layer 200 may be disposed in the same layer, but patterns of the pixel electrodes Ep and a pattern of the gate metal layer 200 need to be manufactured by two patterning processes, and the patterns of the pixel electrodes Ep and the pattern of the gate metal layer 200 do not overlap each other, i.e. there is no electrical connection relation between the pixel electrodes Ep and the gate metal layer 200.

Figure 3:
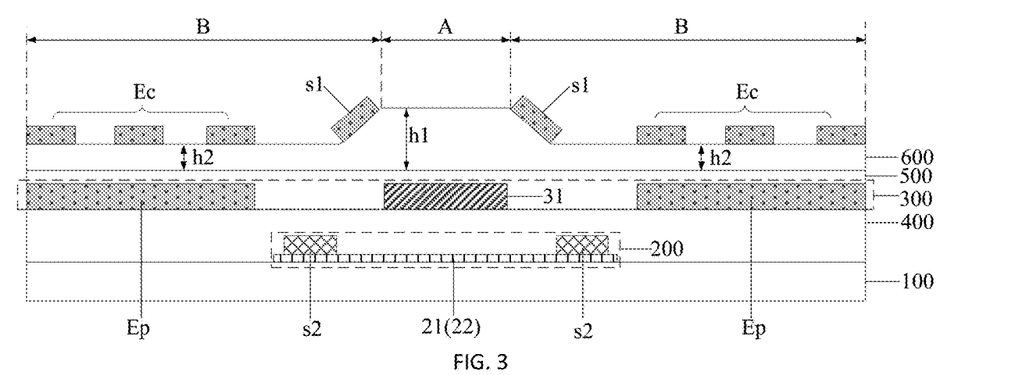
FIG. 3 is a second schematic diagram of a cross-sectional structure of a display panel provided by an embodiment of the present disclosure.

FIG. 3 is a second schematic diagram of the cross-sectional structure of the display panel provided by the embodiment of the present disclosure.

In another implementation, as shown in FIG. 3, the pixel electrodes Ep and the source-drain metal layer 300 may also be disposed in the same layer, and the patterns of the pixel electrodes Ep and a pattern of the source-drain metal layer 300 need to be manufactured by two patterning processes. The pixel electrodes Ep may be directly in lap joint with the source in the source-drain metal layer 300 to realize the electrical connection relation between the pixel electrodes Ep and the source-drain metal layer 300.

In specific implementation, both the common electrodes Ec and the pixel electrodes Ep may be made of transparent conductive materials such as indium tin oxide. The pixel electrodes Ep may be block electrodes, while the common electrodes Ec are comb electrodes. The extending direction of the comb electrodes is same as the extending direction of the first shielding parts s1, and are both the second direction y. The first shielding parts s1 and the common electrodes Ec are made of the same material, and are manufactured by the same patterning process. The first shielding parts s1 and the common electrodes Ec are connected, and both load signals of the common electrodes.

As shown in FIGS. 2 and 3, due to the thickness difference between the first region A and the second regions B, an inclined surface with a certain slope is formed at the boundary between the first region A and each second region B. The first shielding parts s1 are disposed on the inclined surfaces on both sides of the data signal line 31, and the electric field lines generated by the data signal line 31 will radiate outward along the surface of the data signal line 31. The first shielding parts s1 disposed at oblique angles may shield electric field lines transmitted horizontally and obliquely, so that the data signal line has the least interference to liquid crystals in the second regions B.

At the same time, the common electrodes Ec and the pixel electrodes Ep are disposed in the second regions B. Since the thickness of the organic film layer 600 in the second regions B where the common electrodes Ec and the pixel electrodes Ep are located is small, a driving voltage configured to drive the common electrodes Ec and the pixel electrodes Ep may be reduced to a certain extent. The thickness of the organic film layer 600 in the first region A where the data signal lines 31 are located is relatively large. On one hand, the organic film layer 600 on the data signal lines 31 may be relatively flat, which facilitates the placement of spacers above the organic film layer 600; and on the other hand, the distance between the data signal lines 31 and a conductive film layer above may be increased, so as to reduce the coupling effect between the data signal lines 31 and other conductive film layers, which is beneficial to reducing the load of the data signal lines 31.

Since the embodiments of the present disclosure adopt a process of manufacturing the organic film layer 600 with a small dielectric constant on the surface of the thin passivation layer 500 after the passivation layer 500 is manufactured, the storage capacitance between the common electrodes Ec and the pixel electrodes Ep may be reduced. Compared with a solution of manufacturing a thick passivation layer in the prior art, the storage capacitance of the display panel provided by the embodiment of the present disclosure can be greatly reduced. For example, the thickness of the passivation layer in the display panel in the prior art is 4000 angstroms or above, the storage capacitance is A pf, while by using the display panel provided by the embodiment of the present disclosure, the thickness of the passivation layer is reduced to about 1000 angstroms, and after the organic film layer of about 8000 angstroms is formed thereon, the storage capacitance may be reduced by about ½ A pf, that is, the storage capacitance is reduced by half.

Because the storage capacitance is reduced by half, the TFT device may complete driving without a large size. Then, the size of the TFT device is reduced by about half, so that load capacitance C of the scan signal lines 21 may be reduced, and in a case where the original charge is maintained, load resistance R of the scan signal lines 21 may be appropriately increased, that is, the line width is reduced, to ensure an RC network delay equivalent to the previous one.

Similarly, the reduction of the load capacitance C of the data signal lines 31 allows the load resistance R thereof to be appropriately increased, and thus the width of the data signal lines 31 may also be appropriately reduced. After the width of the data signal lines 31 and the width of the scan signal lines 21 are reduced, the opening area of the sub-pixel unit may be effectively increased, and thus the transmittance is further improved.

Figure 4:
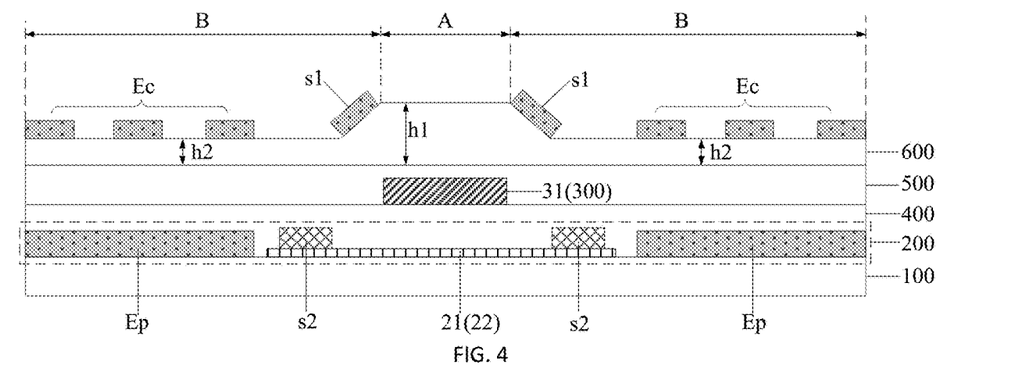
FIG. 4 is a third schematic diagram of a cross-sectional structure of a display panel provided by an embodiment of the present disclosure.

FIG. 4 is a third schematic diagram of the cross-sectional structure of the display panel provided by the embodiment of the present disclosure.

As shown in FIGS. 3 and 4, the display panel provided by the embodiment of the present disclosure further includes: second shielding parts s2 located on sides, facing away from the first shielding parts s1, of the data signal lines 31. Each second shielding part s2 may also be set to be of a strip structure, and the second shielding parts s2 extend in the second direction y. In each sub-pixel unit, both sides of the data signal line 31 in the first direction x are each provided with one second shielding part s2.

Specifically, the second shielding parts s2 and the gate metal layer 200 may be disposed in the same layer. The second shielding parts s2 and the gate metal layer 200 may be manufactured by the same patterning process. When designing the pattern of the gate metal layer 200, the second shielding parts s2 may be connected with the common electrode signal lines, so that the second shielding parts s2 load the signals of the common electrodes.

As shown in FIG. 3, the pixel electrodes Ep and the source-drain metal layer 300 may be disposed in the same layer, and at the moment, the pixel electrodes Ep and the second shielding parts s2 are located in different layers. Or, as shown in FIG. 4, the pixel electrodes Ep and the gate metal layer 200 may also be disposed in the same layer, and at the moment, the pixel electrodes Ep and the second shielding parts s2 are located in the same layer, but are not in contact with each other.

Figure 5:
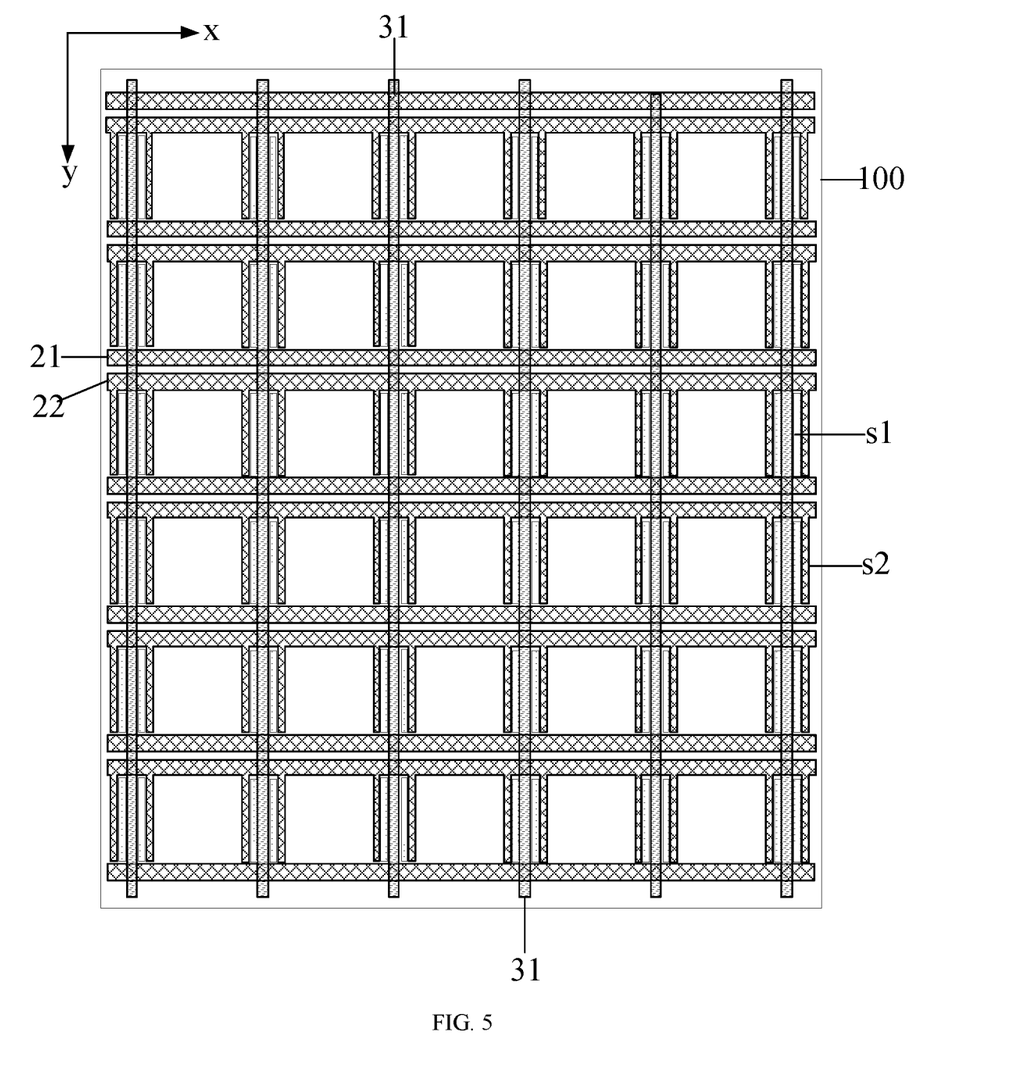
FIG. 5 is a second schematic diagram of a planar structure of a display panel provided by an embodiment of the present disclosure.

FIG. 5 is a second schematic diagram of the planar structure of the display panel provided by the embodiments of the present disclosure.

Referring to FIG. 5, the signals applied by the first shielding parts and the second shielding parts are the same as the signals applied by the common electrodes.

The common electrode signal lines 22 and the scan signal lines 21 both extend in the first direction x, and are arranged in the second direction y. The common electrode signal lines 22 and the scan signal lines 21 are alternately arranged in the second direction y. Thus, for the data signal line 31 adjacent to each sub-pixel unit, the first shielding parts s1 are disposed on both sides above it, the second shielding parts s2 are disposed on both sides below it, and both the first shielding parts s1 and the second shielding parts s2 load the same signals of the common electrodes. Thus, the first shielding parts s1 and the second shielding parts s2 constitute a shielding electric field, and the electric field lines of the data signal lines 31 located in the shielding electric field may be guided by this region, thereby shielding the influence of the data signal lines 31 on the effective electric field of the sub-pixel units.

Figure 6:
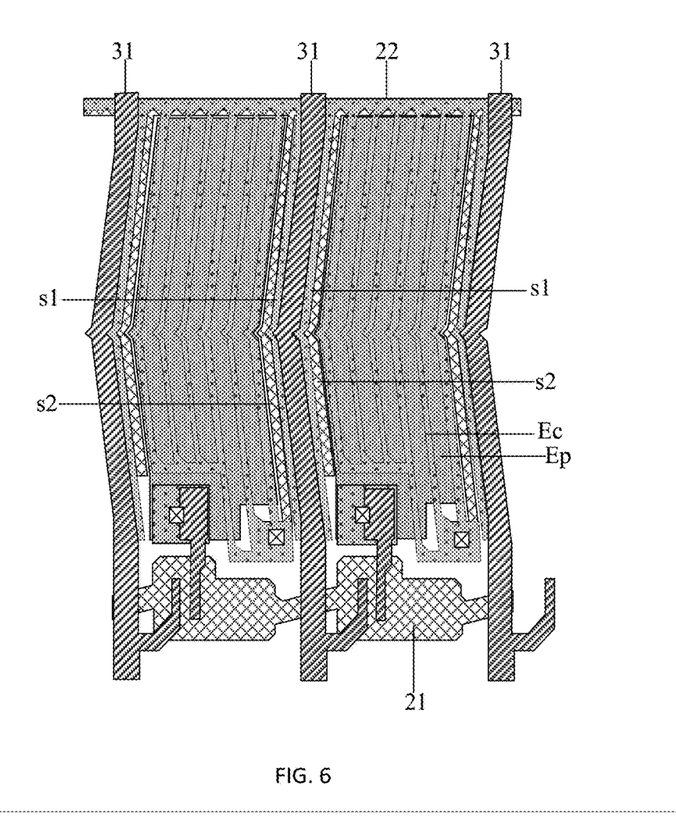
FIG. 6 is a schematic diagram of a planar structure of a sub-pixel unit provided by an embodiment of the present disclosure.

FIG. 6 is a schematic diagram of a planar structure of the sub-pixel unit provided by the embodiment of the present disclosure.

With reference to FIGS. 5 and 6, it can be seen that an orthographic projection of the first shielding part s1 on the first base substrate 100 and an orthographic projection of the data signal line 31 on the first base substrate 100 do not overlap each other. At the same time, an orthographic projection, on the first base substrate 100, of the second shielding part s2 and the orthographic projection, on the first base substrate 100, of the data signal line 31 do not overlap each other. The first shielding part s1, the second shielding part s2 and the data signal line 31 are prevented from overlapping, no parasitic capacitance is formed between the data signal line 31 and the first shielding part s1 as well as between the data signal line 31 and the second shielding part s2, and thus load increase of the data signal line 31 may be avoided.

Figure 7:
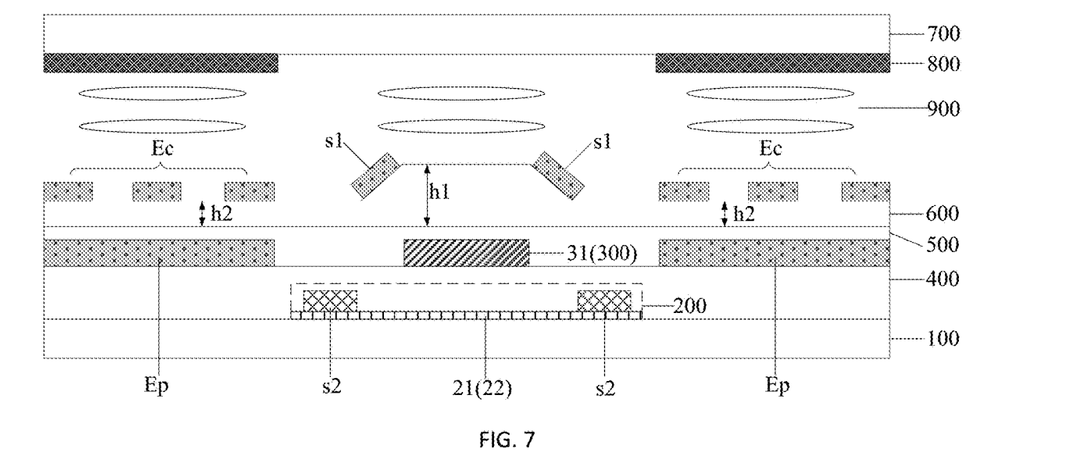
FIG. 7 is a fourth schematic diagram of a cross-sectional structure of a display panel provided by an embodiment of the present disclosure.

FIG. 7 is a fourth schematic diagram of the cross-sectional structure of the display panel provided by the embodiment of the present disclosure.

Referring to FIG. 7, the display panel provided by the embodiment of the present disclosure further includes: a second base substrate 700, a color film layer 800 and a liquid crystal layer 900.

The second base substrate 700 is disposed opposite to the first base substrate 100.

The color film layer 800 is arranged on a side, facing the first base substrate 100, of the second base substrate 700. The color film layer 800 includes a plurality of color film units, and the color film units and the sub-pixel units are arranged in one-to-one correspondence. Each color film unit may filter out different colors of light.

The liquid crystal layer 900 is located between the first base substrate 100 and the second base substrate 700.

Since in the display panel provided by the embodiment of the present disclosure, the common electrodes Ec are the comb electrodes, and extend in the same direction as the data signal lines 31, namely extending vertically, dark fields formed by electrodes extending laterally at the centers of the sub-pixel units may be avoided. At the same time, the vertically extending comb electrodes may be used with positive liquid crystals or negative liquid crystals, both of which may achieve excellent display effects.

Based on the same inventive concept, an embodiment of the present disclosure also provides a display device including any of the display panels. Since the principle for solving the problem of the display device is similar to that of the display panel, the implementation of the display device may be referred to the implementation of the display panel, which will not be repeated.

The embodiments of the present disclosure provide the display panel and the display device. The display panel includes: the first base substrate; the plurality of scan signal lines arranged on one side of the first base substrate, wherein the plurality of scan signal lines extend in the first direction, and are arranged in the second direction, and the first direction and the second direction cross; the plurality of data signal lines arranged on the sides, facing away from the first base substrate, of the scan signal lines, the plurality of data signal lines extend in the second direction, and are arranged in the first direction, and the plurality of scan signal lines and the plurality of data signal lines define the plurality of sub-pixel units; and the first shielding parts arranged on the sides, facing away from the scan signal lines, of the data signal lines, the first shielding part each is of the strip structure and extend in the second directions, and in each sub-pixel unit, both sides, in the first direction, of the data signal line are each provided with a respective one of the first shielding parts. The first shielding parts load the stable signals, so that when the data signal lines generate the electric field lines to the sub-pixel unit region, the electric field lines will be shielded by the first shielding parts, thereby improving the influence of the signals of the data signal lines on the effective electric field in the edge regions of the sub-pixel units, decreasing the width of the black matrix covering the data signal lines, increasing the opening areas of the sub-pixel units, and improving the transmittance.

Although the preferred embodiments of the present disclosure have been described, additional variations and modifications can be made to these embodiments by those skilled in the art once the basic inventive concept is known. Therefore, it is intended that the appended claims be interpreted as including the preferred embodiments and all variations and modifications that fall within the scope of the present disclosure.

It will be apparent to those skilled in the art that various modifications and variations may be made to the present disclosure without departing from the spirit or scope of the present disclosure. Thus, it is intended that the present disclosure cover the modifications and variations of the present disclosure provided they come within the scope of the appended claims and their equivalents.

What is claimed is:
1. A display panel, comprising:
a first base substrate;
a plurality of scan signal lines arranged on a side of the first base substrate, wherein the plurality of scan signal lines extend in a first direction, and are arranged in a second direction, and the first direction and the second direction intersect;
a plurality of data signal lines arranged on sides, facing away from the first base substrate, of the scan signal lines, wherein the plurality of data signal lines extend in the second direction, and are arranged in the first direction, and the plurality of scan signal lines and the plurality of data signal lines define a plurality of sub-pixel units; and
first shielding parts arranged on sides, facing away from the scan signal lines, of the data signal lines, wherein the first shielding parts each is of a strip structure and extends in the second direction, and
in each of the sub-pixel units, both sides, in the first direction, of the data signal line are each provided with a respective one of the first shielding parts;
the display panel further comprises:
a gate metal layer arranged on the first base substrate, wherein the gate metal layer comprises patterns of the plurality of scan signal lines and patterns of a plurality of common electrode signal lines;
a gate insulating layer arranged on a side, facing away from the first base substrate, of the gate metal layer;
a source-drain metal layer arranged on a side, facing away from the gate metal layer, of the gate insulating layer, wherein the source-drain metal layer comprises patterns of the plurality of data signal lines;
a passivation layer arranged on a side, facing away from the gate insulating layer, of the source-drain metal layer; and
an organic film layer arranged on a side, facing away from the source-drain metal layer, of the passivation layer;
wherein the first shielding parts are arranged on a surface of a side, facing away from the passivation layer, of the organic film layer;
wherein a first region of the organic film layer covers the data signal lines, a region, other than the first region, of the organic film layer is a second region, and a thickness of the first region is greater than a thickness of the second region; and the organic film layer is arranged as an inclined surface at a boundary between the first region and the second region, and the first shielding parts are disposed on the inclined surface.

2. The display panel according to claim 1, further comprising:
a plurality of pixel electrodes; and
a plurality of common electrodes; wherein
the pixel electrodes and the gate metal layer are disposed in a same layer, and a pattern of the pixel electrodes and a pattern of the gate metal layer do not overlap each other; or, the pixel electrodes and the source-drain metal layer are disposed in a same layer; and
the common electrodes are arranged on the surface of the side, facing away from the passivation layer, of the organic film layer.

3. The display panel according to claim 2, wherein the common electrodes each is a comb electrode, and an extending direction of the comb electrode is the second direction;
the first shielding parts and the common electrodes are connected with each other; and
signals applied by the first shielding parts are same as signals applied by the common electrodes.

4. The display panel according to claim 2, further comprising:
second shielding parts arranged on sides, facing away from the first shielding parts, of the data signal lines, wherein the second shielding parts each is of a strip structure and extends in the second direction, and
in each of the sub-pixel units, both sides, in the first direction, of the data signal line are each provided with a respective one of the second shielding parts.

5. The display panel according to claim 4, wherein the second shielding parts and the gate metal layer are disposed in a same layer; the second shielding parts are connected with the common electrode signal lines; and
signals applied by the first shielding parts are same as signals applied by the common electrodes and signals applied by the second shielding parts are same as signals applied by the common electrodes.

6. The display panel according to claim 1, wherein the thickness of the first region is set to range from 2 μm-3 μm, and the thickness of the second region is 8000 Å.

7. The display panel according to claim 1, wherein an orthographic projection, on the first base substrate, of the first shielding parts does not overlap with an orthographic projection, on the first base substrate, of the data signal lines.

8. The display panel according to claim 4, wherein an orthographic projection, on the first base substrate, of the second shielding parts does not overlap with an orthographic projection, on the first base substrate, of the data signal lines.

9. The display panel according to claim 1, wherein a thickness of the passivation layer is 1000 Å.

10. The display panel according to claim 1, wherein the pixel electrode is a block electrode.

11. The display panel according to claim 1, further comprising:
a second base substrate disposed opposite to the first base substrate;
a color film layer arranged on a side, facing the first base substrate, of the second base substrate; and
a liquid crystal layer arranged between the first base substrate and the second base substrate.

12. The display panel according to claim 11, wherein the liquid crystal layer adopts positive liquid crystals or negative liquid crystals.

13. A display device, comprising the display panel according to claim 1.

* * * * *